I # (12) United States Patent
Nishikawa

(10) Patent No.: US 10,228,239 B2
(45) Date of Patent: Mar. 12, 2019

(54) MEASURING APPARATUS, MEASURING METHOD, AND ARTICLE MANUFACTURING METHOD

(71) Applicant: CANON KABUSHIKI KAISHA, Tokyo (JP)

(72) Inventor: Yuya Nishikawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/361,740

(22) Filed: Nov. 28, 2016

(65) Prior Publication Data

US 2017/0160078 A1 Jun. 8, 2017

(30) Foreign Application Priority Data

Dec. 3, 2015 (JP) ................................. 2015-236832

(51) Int. Cl.
| G06K 9/46 | (2006.01) |
| G06T 7/00 | (2017.01) |
| G06T 7/11 | (2017.01) |
| G06T 7/13 | (2017.01) |
| G01B 11/24 | (2006.01) |
| H04N 5/225 | (2006.01) |
| G06T 7/70 | (2017.01) |

(52) U.S. Cl.
CPC ........ G01B 11/2433 (2013.01); G06K 9/4604 (2013.01); G06T 7/004 (2013.01); G06T 7/0081 (2013.01); G06T 7/0085 (2013.01); H04N 5/2256 (2013.01); G06T 7/0004 (2013.01); G06T 7/11 (2017.01); G06T 7/13 (2017.01); G06T 7/70 (2017.01)

(58) Field of Classification Search
CPC .............. G01B 11/2433; G06K 9/4604; G06T 7/0004; G06T 7/70; G06T 7/11; G06T 7/13; G06T 7/004; G06T 7/0081; G06T 7/0085; H04N 5/2256
USPC ........................................................ 382/141
See application file for complete search history.

(56) References Cited

U.S. PATENT DOCUMENTS

| 2005/0213458 A1* | 9/2005 | Iwase .................... H01L 23/544 369/53.35 |
| 2008/0240511 A1* | 10/2008 | Ban ........................ B25J 9/1697 382/108 |
| 2010/0289797 A1* | 11/2010 | Tateno .................... G06T 17/00 345/419 |

(Continued)

FOREIGN PATENT DOCUMENTS

JP H0953915 A 2/1997

*Primary Examiner* — Jon Chang
(74) *Attorney, Agent, or Firm* — Rossi, Kimms & McDowell LLP

(57) ABSTRACT

Provided is a measuring apparatus which includes an imaging device configured to image an object to obtain image data and a processor configured to process the image data to recognize a region of the object. The processor is configured to perform feature extraction on the image data to obtain first feature data, perform projection of a three-dimensional model of the object, whose region is recognized based on the image data, onto a predetermined surface and perform the feature extraction on image data obtained by the projection to obtain second feature data, and perform determination of whether there is an unrecognized object based on the first feature data and the second feature data.

14 Claims, 8 Drawing Sheets

(56) References Cited

U.S. PATENT DOCUMENTS

2013/0250050 A1\* 9/2013 Kanaujia ............ H04N 13/0007
348/42

\* cited by examiner

MEASURING APPARATUS, MEASURING METHOD, AND ARTICLE MANUFACTURING METHOD

BACKGROUND OF THE INVENTION

Field of the Invention

The present invention relates to a measuring apparatus, a measuring method, and an article manufacturing method.

Description of the Related Art

In gripping or assembly of articles (works) by robot arms, a machine vision technology is used. Works are individually recognized (measured) by machine vision and the robot arms are controlled. When there are works not to be gripped or assembled in the vicinity of works to be gripped or the like, if the works not to be gripped or assembled are not measured, it is difficult for the robot arms to perform predetermined gripping or assembly. As factors preventing measurement of works, several cases are considered: a case in which upper and lower surfaces of works overlap, a case in which side surfaces of works are in contact with each other, and the like. Japanese Patent Laid-Open No. H9-53915 discloses a technology of determining the top and bottom of overlapping works.

The above document is only for determining the top and bottom of overlapping objects to be gripped or assembled. Therefore, if there is an object that cannot be recognized because the object is overlapped, processing such as gripping or assembly of the object based on information only on a recognized object may not be appropriately performed.

SUMMARY OF THE INVENTION

The present invention provides, for example, a measuring apparatus advantageous in evaluation of recognition of objects overlapping each other.

The present invention provides a measuring apparatus which includes an imaging device configured to image an object to obtain image data and a processor configured to process the image data to recognize a region of the object. The processor is configured to perform feature extraction on the image data to obtain first feature data, perform projection of a three-dimensional model of the object, whose region is recognized based on the image data, onto a predetermined surface and perform the feature extraction on image data obtained by the projection to obtain second feature data, and perform determination of whether there is an unrecognized object based on the first feature data and the second feature data.

Further features of the present invention will become apparent from the following description of exemplary embodiments with reference to the attached drawings.

DESCRIPTION OF THE EMBODIMENTS

The following describes embodiments of the present invention with reference to drawings and the like.

(First Embodiment)

Figure 1:
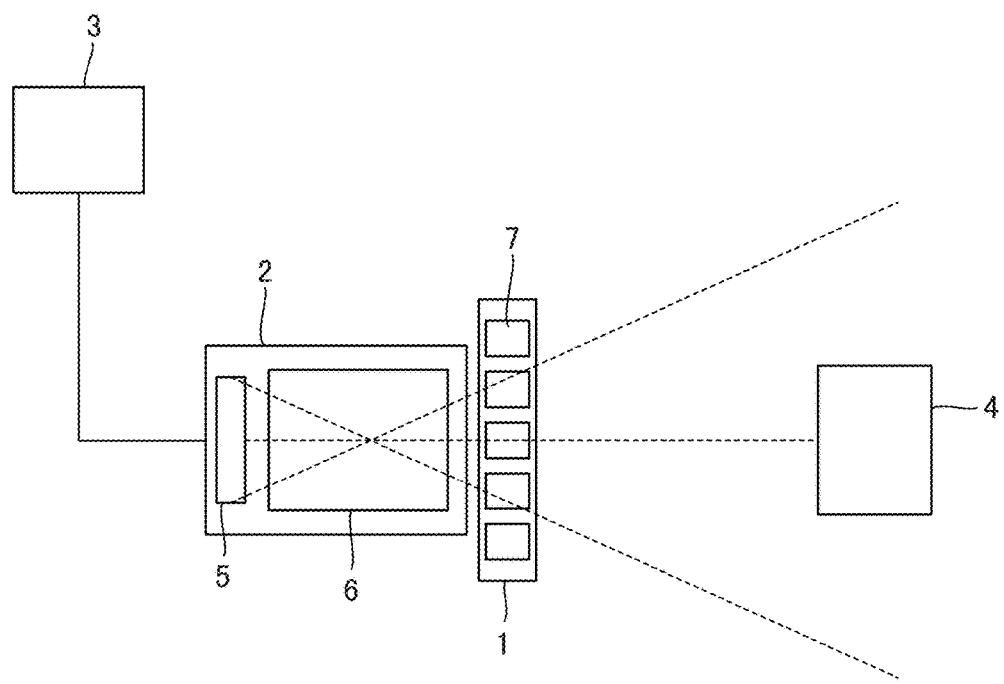
FIG. 1 is a diagram which shows a configuration example of a measuring apparatus according to a first embodiment.

FIG. 1 is a diagram which shows a configuration example of a measuring apparatus in the present embodiment. A measuring apparatus according to the embodiment is industrial equipment which sets a part, a mold for manufacturing parts, or the like as a target object (object to be measured) and measures (recognizes) a position and posture (region) of the object in a non-contact manner. In the embodiment, as light used in the measurement, only uniform light is used without using pattern light. The measuring apparatus includes an illumination unit 1, an imaging device 2, and a processor 3.

Figure 2:
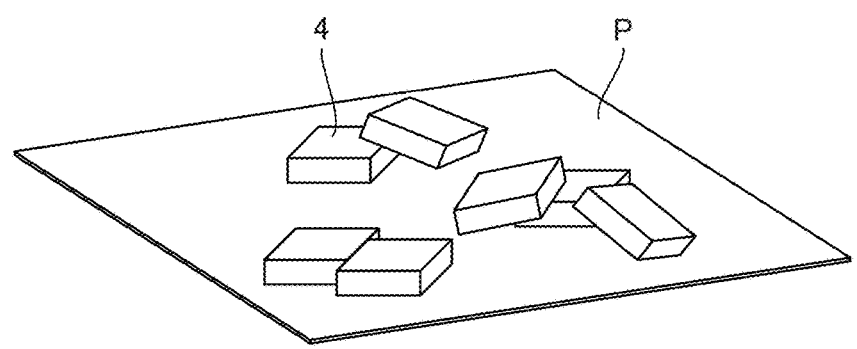
FIG. 2 is a diagram which shows a placement state of an object on a plane.

The illumination unit 1 uniformly illuminates an object 4 and has a plurality of LED light sources 7 placed around an optical axis of the imaging device 2 in a ring shape, for example. A plurality of objects 4 are placed on a plane P to vertically overlap or having side surfaces in contact with each other, as shown in FIG. 2. The illumination unit 1 may be any means which can uniformly illuminate the object 4 such as bar illumination or coaxial epi-illumination. The imaging device 2 includes an imaging optical system 5 and an image sensor 6, and acquires captured images of the uniformly illuminated objects 4. The imaging optical system 5 forms images of the objects 4 uniformly illuminated by the illumination unit 1 in the image sensor 6. The image sensor 6 is an element for imaging the objects 4, and can be, for example, a CMOS sensor, a CCD sensor, and the like. The processor 3 processes images (image data) acquired by the imaging device 2 and obtains positions and postures of the objects 4 placed as shown in FIG. 2.

The processor 3 performs edge extraction on the object 4 using an edge detection algorithm such as a Canny method, and obtains an edge image (contour image) with respect to an output (image) of the imaging device 2. Then, the processor 3 obtains the positions and the postures of the objects 4 based on the edge image using a known method.

Figure 3:
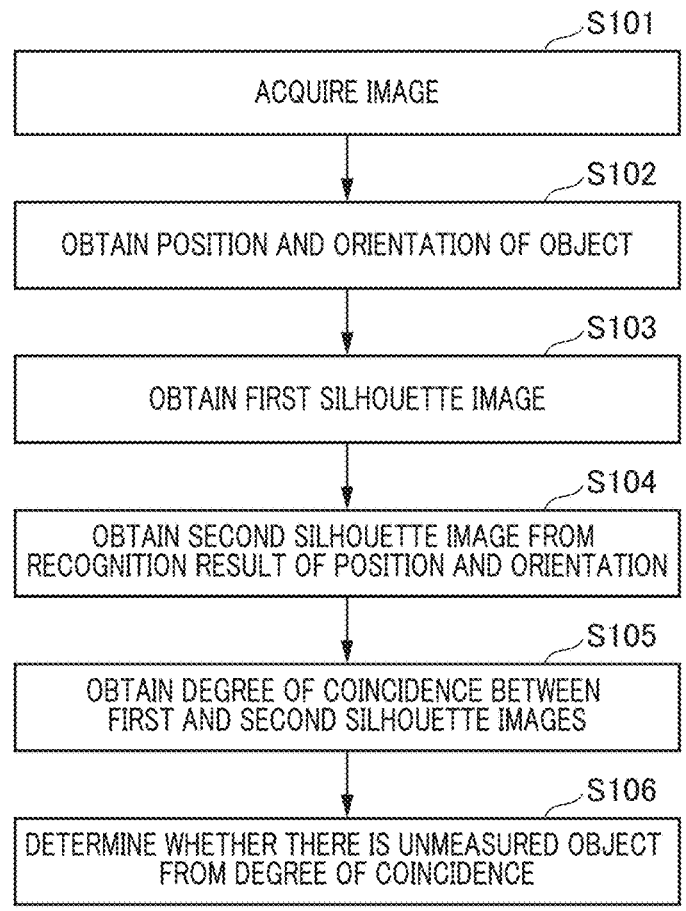
FIG. 3 is a flowchart which shows a flow of determination of whether there is an unmeasured object.
Figure 4A:
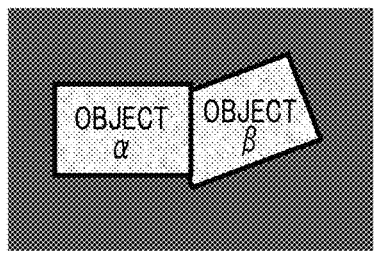
FIG. 4A is a diagram which shows an image acquired by an imaging device.
Figure 4B:
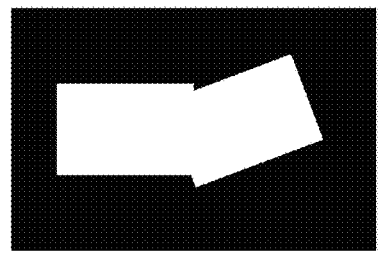
FIG. 4B is a diagram which shows a first silhouette image.

According to the placement state of the objects 4, there remains an object (unrecognized object) whose position and posture cannot be measured (recognized). FIG. 3 is a flowchart showing a flow of determination of whether there is an unrecognized object (unmeasured object). In step S101, the processor 3 acquires an image obtained by imaging by the imaging device 2. In step S102, the processor 3 obtains an edge image and obtains the positions and postures (regions)

of the objects 4 based on the edge image as described above. In step S103, the processor 3 obtains a first silhouette image (first feature data) from the image (FIG. 4A) acquired in step S101. The silhouette image is, for example, an image (FIG. 4B) representing regions (occupied regions) occupied by the objects 4 found by performing binarization processing (feature extraction) on pixel values of the image (image data) shown in FIG. 4A. In FIG. 4B, two of the objects 4 (object α and object β) are recognized as one silhouette. In this binarization processing, regions occupied by the objects 4 are set as 1, and the other regions are set as 0.

Figure 5:
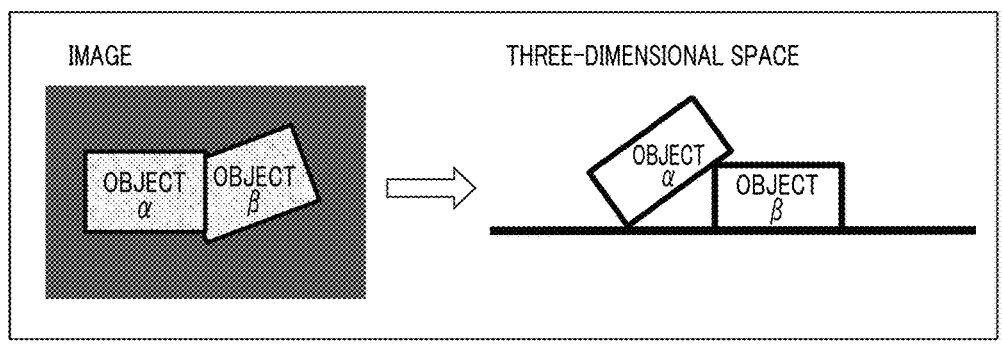
FIG. 5 is a diagram which describes a method of obtaining a second silhouette image.
Figure 6:
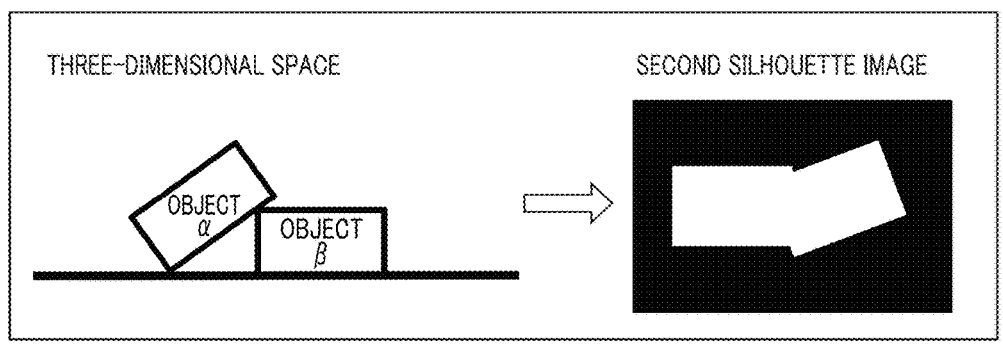
FIG. 6 is a diagram which describes the method of obtaining the second silhouette image.

In step 5104, the processor 3 obtains a second silhouette image (second feature data) based on the positions and postures of the objects 4 obtained in step S102. FIGS. 5 and 6 are diagrams which describes a method of obtaining the second silhouette image stepwise. As shown in FIG. 5, the processor 3 first places, for example, three-dimensional models of the object α and the object β whose shapes are known in advance on a three-dimensional space based on the positions and postures of the objects 4 obtained instep S102. This is performed with respect to all the objects 4 obtained in step S102. Subsequently, the processor 3 obtains the second silhouette image by performing the same processing (binarization processing) as for the first silhouette image on an image obtained by projecting the three-dimensional model of FIG. 5 onto a predetermined two-dimensional plane (surface captured by an imaging device) as shown in FIG. 6. A projection method is based on a pinhole camera model. That is, the projection method uses internal parameters (focal length, principal point) and external parameters (position, posture) of the imaging device 2, which are obtained by calibration performed in advance. The second silhouette image, like the first silhouette image, is an image representing regions occupied by the objects 4. FIGS. 5 and 6 show cases in which a measuring apparatus can correctly measure the object a and the object β, and thus regions occupied by objects in an image of FIG. 5 are approximate to regions occupied by objects in the silhouette image of FIG. 6.

Figure 7:
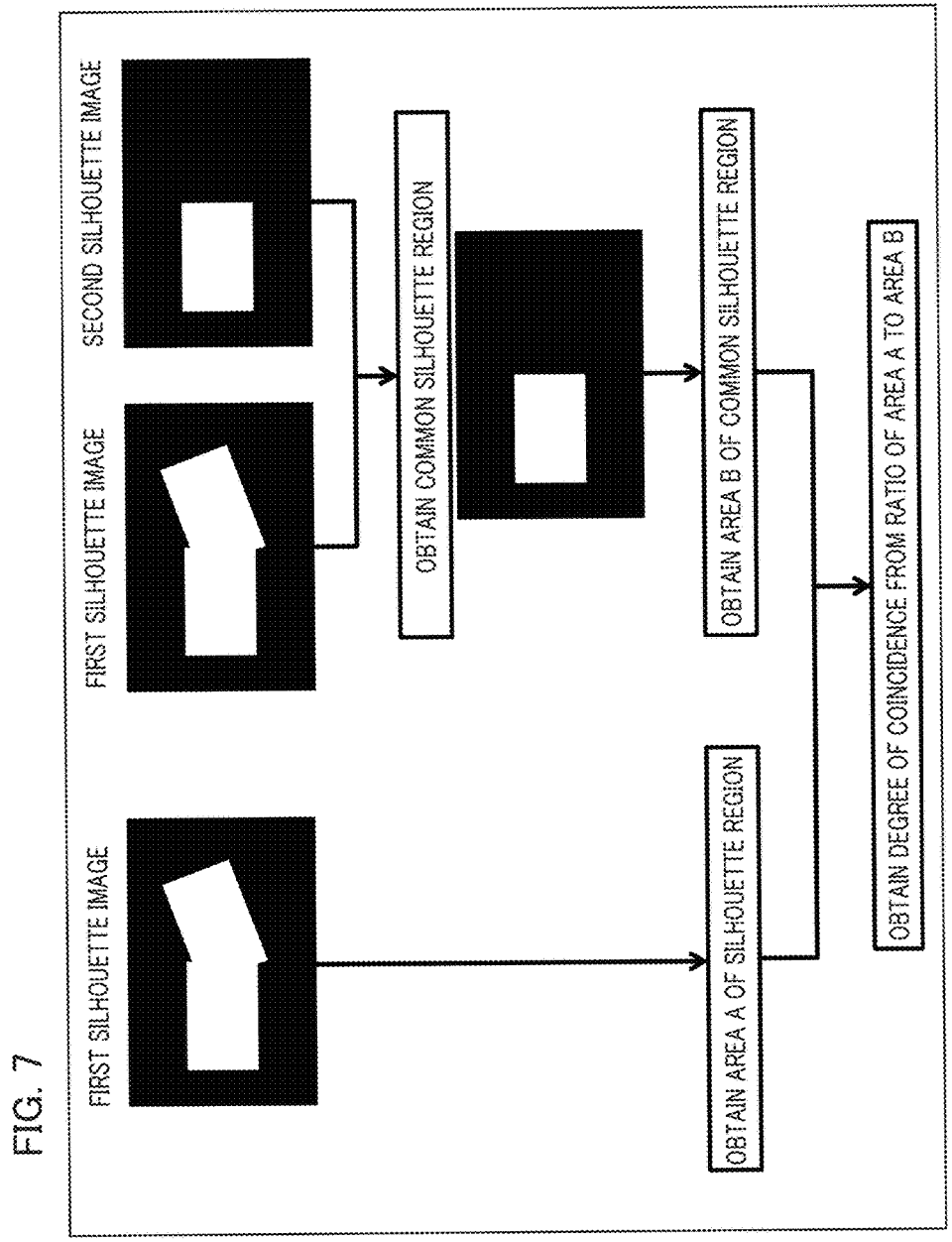
FIG. 7 is a diagram which shows a method of obtaining a degree of coincidence by comparing areas of silhouette images.

In step S105, the processor 3 obtains a degree of coincidence between the first silhouette image and the second silhouette image. FIG. 7 is a diagram which shows a method of obtaining a degree of coincidence by comparing areas of the silhouette images. The processor 3 obtains an area A of regions occupied by the objects 4 in the first silhouette image. In addition, an area B (comparison result) of an overlapping portion between the regions occupied by the objects 4 in the first silhouette image and regions occupied by the objects 4 in the second silhouette image is obtained. Then, a degree of coincidence is obtained based on a ratio (B/A) of the area A to the area B. The processor 3 may obtain the degree of coincidence based on a ratio (b/a) of a length (a) of the contour of the objects 4 in the first silhouette image to a length (b) of the contour of the objects 4 in the second silhouette image. A reference for comparison (degree of coincidence) is not limited thereto, but may vary.

Figure 8:
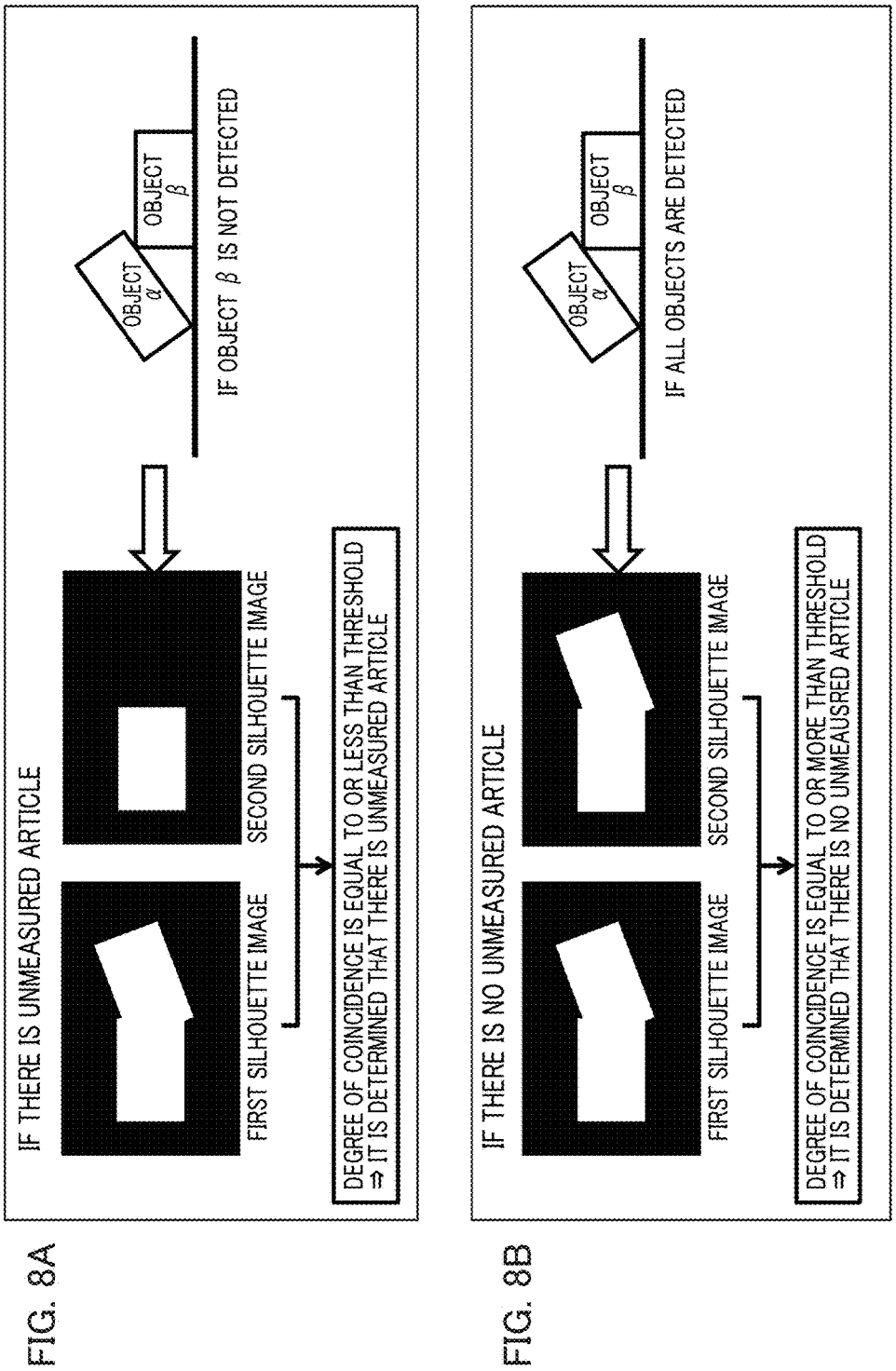
FIG. 8A is a diagram which shows a case in which it is determined that there is an unmeasured object.
FIG. 8B is a diagram which shows a case in which it is determined that there is no unmeasured object.
Figure 9:
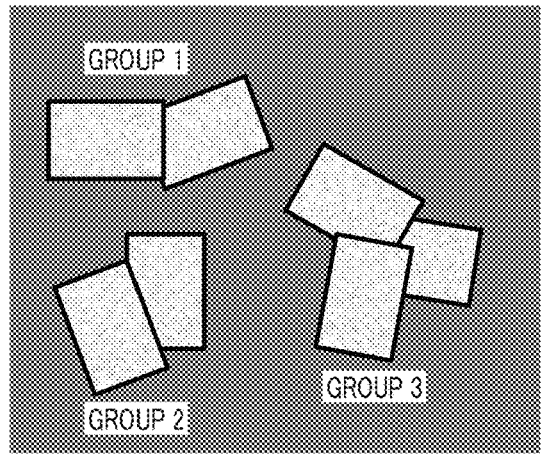
FIG. 9 is a diagram which shows an example of an image in a case in which a plurality of objects overlap.

In step S106, the processor 3 determines whether there is an unmeasured object based on the degree of coincidence obtained in step S105. FIGS. 8A and 8B are diagrams which describe the determination method. As shown in FIG. 8A, the processor 3 determines that there is an unmeasured object if the degree of coincidence calculated in step S105 is less than a threshold value set in advance. On the other hand, as shown in FIG. 8B, the processor 3 determines that there is no unmeasured object if the degree of coincidence calculated in step S105 exceeds the threshold value set in advance. Steps S101 to S106 are performed for each group of the objects 4 recognized integrally in an image obtained by imaging. For example, in a case of an image shown in FIG. 9, these steps are performed for each of three object groups.

As described above, the measuring apparatus of the embodiment can determine whether there is an unmeasured object by using only a uniform light without using a pattern light. According to the embodiment, it is possible to provide a measuring apparatus which is advantageous for evaluating recognition of overlapping objects.

(Second Embodiment)

Next, a measuring apparatus according to a second embodiment of the present invention will be described. In the first embodiment described above, binarization processing of images is performed to determine whether there is an unmeasured object. In contrast, the present embodiment is characterized in using an edge image obtained from an image obtained by imaging.

Figure 10:
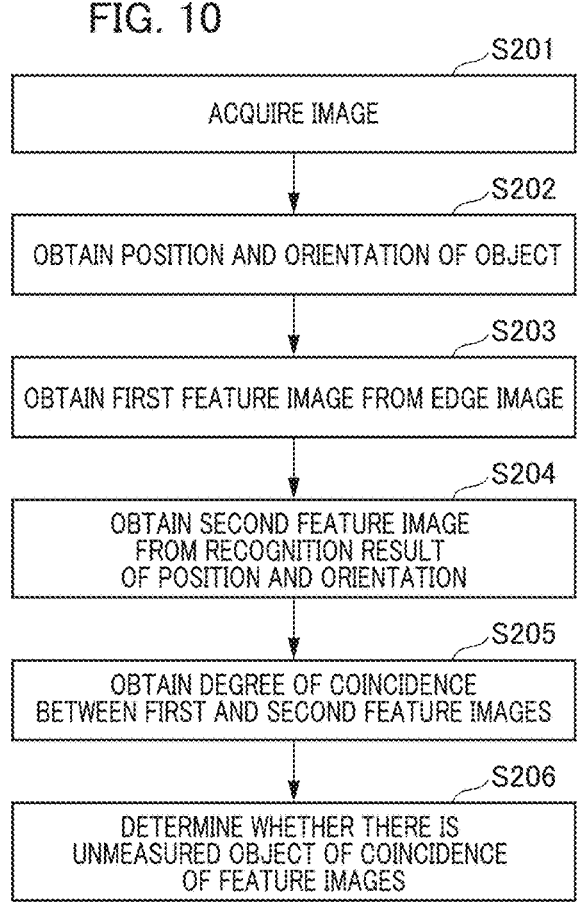
FIG. 10 is a flowchart which shows a flow of determination of whether there is an unmeasured object.
Figure 11A:
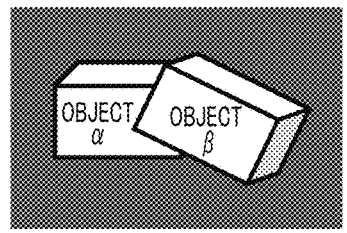
FIG. 11A is a diagram which shows an edge image.
Figure 11B:
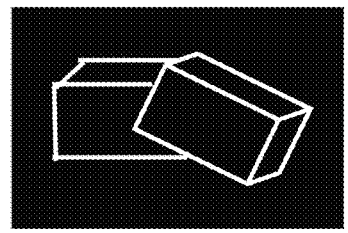
FIG. 11B is a diagram which shows a first feature image.

FIG. 10 is a flowchart which shows a flow of determination of whether there is an unmeasured object according to the embodiment. Steps S201 and S202 are the same as steps S101 and S102 in the first embodiment, and description thereof will be omitted. In step S203, the processor 3 obtains a first feature image from an edge image obtained instep S202. The first feature image (FIG. 11B) is obtained by performing binarization processing (regions occupied by edges are set as 1, and the other regions are set as 0) on, for example, an edge image shown in FIG. 11A.

In step S204, the processor 3 obtains a second feature image (a second feature data) from a result of measuring positions and postures of the objects 4 obtained in step S202. In this method, firstly, three-dimensional shape models of the object α and the object β whose shapes are known in advance are placed on a three-dimensional space based on the positions and postures of the objects 4 obtained in step S202. Subsequently, the processor 3 obtains the second feature image by projecting portions equivalent to edges of the three-dimensional shape models onto a two-dimensional plane (image plane).

Figure 12:
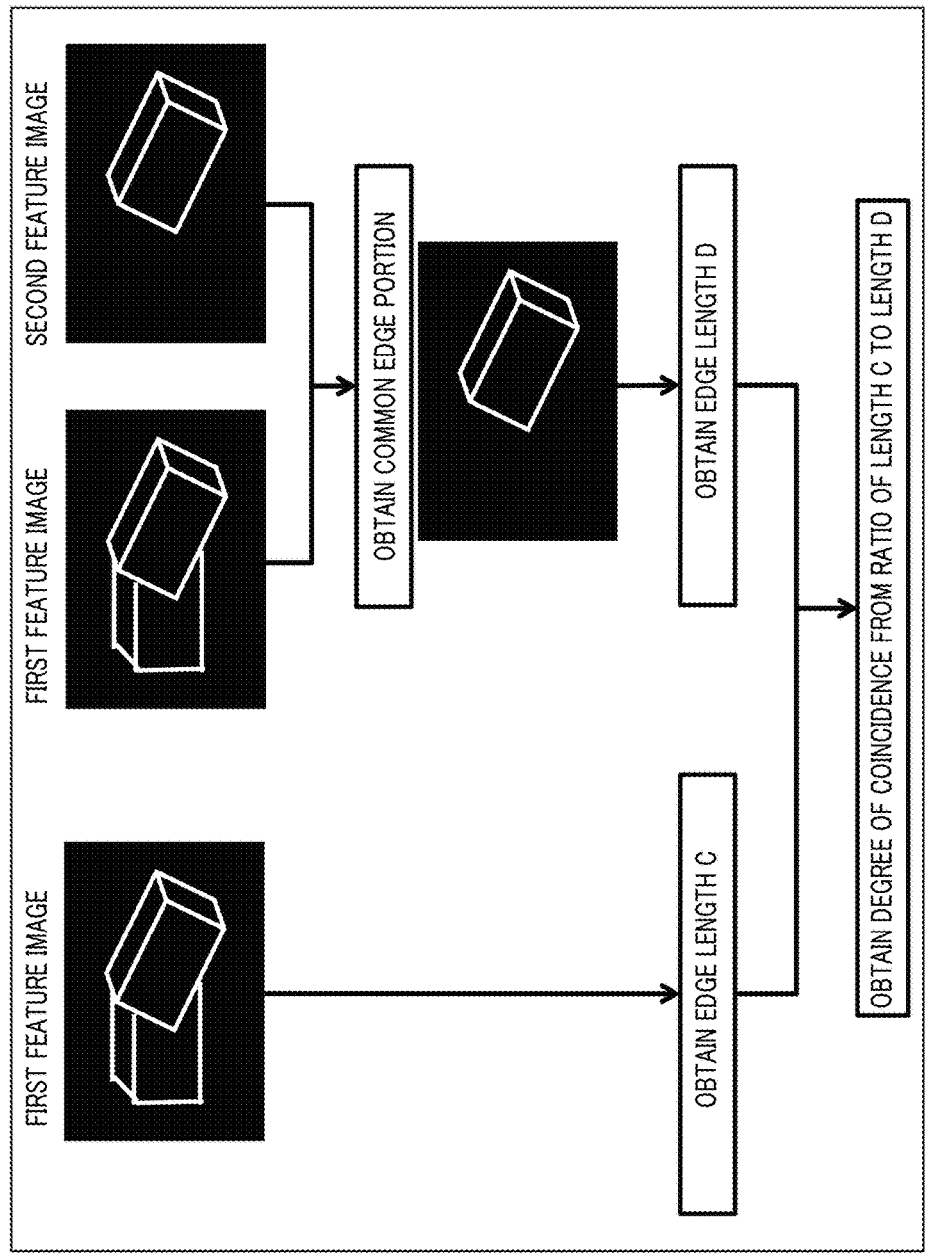
FIG. 12 is a diagram which shows a method of obtaining a degree of coincidence by comparing lengths (total lengths) of edges of respective feature images.

In step S205, the processor 3 obtains the degree of coincidence between the first feature image and the second feature image. FIG. 12 is a diagram which shows a method of obtaining the degree of coincidence by comparing lengths (total extensions) of edges of respective feature images. The processor 3 obtains a length C of edges of the first feature image and a length D of a common portion between the edges of the first feature image and edges of the second feature image. Then, the processor 3 obtains the degree of coincidence based on a ratio (D/C) of the length C to the length D. The processor 3 may obtain the degree of coincidence by comparison of positions, lengths, and numbers of at least one portion (for example, contour portion) of the edges. In addition, the at least one portion of the edges may include a contour of an object, a line segment configured by the edges, and an intersection of the edges, and the degree of coincidence may be obtained based on these.

In step S206, the processor 3 determines whether there is an unmeasured object based on the degree of coincidence obtained in step S205. The determination method is the same as in step S106. The measuring apparatus of the embodiment also exhibits the same effects as in the first embodiment.

In the embodiment described above, uniform light is used as measuring light, but the light quantity distribution may be made using non-uniform light which is known. In addition, shapes of objects may all be the same as each other or different from each other.

(Embodiment According to an Article Manufacturing Method)

The measuring apparatus according to the embodiments described above is used in an article manufacturing method. The article manufacturing method includes a process of measuring an object (recognizing a region of an object) using the measuring apparatus, and a process of processing the object on which measuring (recognizing) is performed in the process. The processing includes, for example, at least one of machining, cutting, transporting, assembly, inspection, and sorting. The article manufacturing method of the embodiment is advantageous in at least one of performance, quality, productivity, and production costs of articles, compared to a conventional method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-236832 filed on Dec. 3, 2015, which is hereby incorporated by reference herein in its entirety.

What is claimed is:

1. A measuring apparatus comprising:
a first processor configured to obtain a first feature data by performing a binarization processing of a region in which objects are provided, the objects being overlapped with each other, in image data obtained by an imaging device;
an acquiring unit configured to obtain a position and a posture of at least one object among the objects on the basis of the first feature data obtained by the first processor;
a second processor configured to obtain a second feature data of the at least one object, based on a three-dimensional model of the object, which is recognized based on the position and the posture obtained by the acquiring unit; and
a determination unit configured to determine that the at least one object is all of the objects in the region and there is no unrecognized object when a degree of coincidence between the first feature data and the second feature data is larger than a threshold value, and determine that the at least one object is a part of the objects in the region and there is an unrecognized object when the degree of coincidence between the first feature data and the second feature data is less than the threshold value.

2. The measuring apparatus according to claim 1, wherein the binarization processing is a binarization of pixel values in the image data.

3. The measuring apparatus according to claim 2, wherein the determination unit calculates the degree of coincidence on the basis of an region of the objects in the first feature data and an region of the objects in the second feature data.

4. The measuring apparatus according to claim 1, wherein the first processor obtains the first feature data by an edge extraction of the region in which the binarization processing is performed.

5. The measuring apparatus according to claim 4, wherein the determination unit determines the degree of coincidence on the basis of edges of the objects in the first feature data and edges of the at least one object in the second feature data.

6. The measuring apparatus according to claim 5, wherein the determination unit determines the degree of coincidence on the basis of at least one of a position, a length, and a number of the edges of the objects in the first feature data and at least one of a position, a length, and a number of the edges of the at least one object in the second feature data.

7. The measuring apparatus according to claim 6, wherein the edges of the objects in the first feature data include at least one of a contour of the objects, a line segment of the edges, and an intersection of the edges, and the edges of the at least one object in the second feature data include at least one of a contour of the at least one object, a line segment of the edges, and an intersection of the edges.

8. The measuring apparatus according to claim 1, further comprising an illumination device configured to illuminate the objects.

9. The measuring apparatus according to claim 1, wherein the objects have the same shape.

10. The measuring apparatus according to claim 1, wherein the objects are separated into two or more groups, and
wherein the determination unit determines whether the degree of coincidence between the first feature data and the second feature data is larger or less than the threshold value for each of the two or more object groups, when the image data includes the object groups, and
each of the object groups includes the objects which overlap each other.

11. The measuring apparatus according to claim 1, wherein the objects are separated into two or more groups, and
wherein a processing of the first processor, a processing of the acquiring unit, a processing of the second processor, and a processing of the determination unit are performed for each of the two or more object groups, when the image data includes the object groups, and
each of the object groups includes the objects which overlap each other.

12. The measuring apparatus according to claim 1, wherein the first processor performs the binarization processing of an edge image in the region.

13. A measuring method comprising:
obtaining a first feature data by performing a binarization processing of a region in which objects are provided, the objects being overlapped with each other in image data obtained by an imaging device;
obtaining a position and a posture of at least one object among the objects on the basis of the obtained first feature data;
obtaining a second feature data of the at least one object, based on a three-dimensional model of the object, which is recognized based on the obtained position and the obtained posture;
determining that the at least one object is all of the objects in the region and there is no unrecognized object when a degree of coincidence between the first feature data and the second feature data is larger than a threshold value; and
determining that the at least one object is a part of the objects in the region and there is an unrecognized object when the degree of coincidence between the first feature data and the second feature data is less than the threshold value.

14. An article manufacturing method comprising:
performing a measurement of objects; and
manufacturing an article on the basis of the measurement,
the measurement comprising:
obtaining a first feature data by performing a binarization processing of a region in which objects are provided, the objects being overlapped with each other in image data obtained by an imaging device;
obtaining a position and a posture of at least one object among the objects on the basis of the obtained first feature data;
obtaining a second feature data of the at least one object, based on a three-dimensional model of the object, which is recognized based on the obtained position and the obtained posture;
determining that the at least one object is all of the objects in the region and there is no unrecognized object when a degree of coincidence between the first feature data and the second feature data is larger than a threshold value; and
determining that the at least one object is a part of the objects in the region and there is an unrecognized object when the degree of coincidence between the first feature data and the second feature data is less than the threshold value.

* * * * *